Dec. 10, 1968  J. C. KUZARA  3,416,014
UNIDIRECTIONAL STARTING MECHANISM FOR SYNCHRONOUS
A.C. SELF-STARTING MOTORS
Filed May 16, 1966

INVENTOR.
JOHN C. KUZARA
BY
Donald P. Gillette
ATTORNEY

United States Patent Office 3,416,014
Patented Dec. 10, 1968

3,416,014
UNIDIRECTIONAL STARTING MECHANISM FOR SYNCHRONOUS A.C. SELF-STARTING MOTORS
John C. Kuzara, New Britain, Conn., assignor to The Sessions Clock Co., Forestville, Conn., a corporation of Connecticut
Filed May 16, 1966, Ser. No. 550,337
9 Claims. (Cl. 310—41)

This invention relates to a limiting mechanism, commonly called a no-back for use on motors that are capable of running in either direction. The purpose of a no-back is to prevent such motors from operating in one direction. In particular the no-back of the present invention is adapted to control the starting direction of a motor of the type described in Everard et al. Patent 3,059,131 so that it will start and run in only one direction, although without a no-back this type of motor will start and run almost equally well in either direction.

No-back mechanisms, as such, are well-known, but many of them have been subject to excessive wear of parts of the no-back or have caused undue wear of the motors to which they were attached. Some have caused an excessive loss of power or have been subject to one or more of a number of other faults. The present invention comprises a no-back having only a single, very lightweight part constructed of low friction plastic material and co-operating with a special pinion coupled to the rotor of a bi-directional motor. More specifically the no-back includes a special pinion having an odd number of teeth, preferably three and not over five, and a yoke with a central opening in which the pinion rotates and the inner perimeter of which is a cam shaped something like two half sections of a heart, one of the sections being inverted with respect to the other so that the aperture is truly symmetrical rather than mirror-image symmetrical. The yoke is limited in its movement by stationary pins or other guiding means that permit it to move back and forth in only one direction as the teeth of the pinion press against the cam surface of the yoke to cause it to move first in one direction, as determined by the guiding means, and then in the opposite direction. Furthermore, the cam surface has two diametrically opposite abutment edges at the end of sloping ramp surfaces, the height of each of the ramp surfaces being sufficient to shift the cam member so far in one direction under pressure from the rotating teeth of the pinion that the abutment edge at the end of the other ramp section will be brought into the path of rotation of the same or other teeth of the pinion. When the abutment edge is so positioned, the teeth of the pinion cannot rotate back past it but will be held in a specific location when any tooth strikes the abutment edge. This edge must be oriented with respect to the poles of the motor so that the motor is self-starting in the proper direction to rotate the teeth away from the abutment edge.

A form of cam member that has been found to be very satisfactory is a flat, symmetrical, dimensionally stable cam member of suitable plastic material capable of being molded. The cam member is held in place on a platform having means interlocking with the stator poles of the motor to furnish the necessary limitation to the location of the sliding cam member.

It is one of the objects of the present invention to provide an improved structure capable of limiting the rotation of a motor to one direction. A second object is to provide such a structure in which the direction of rotation can be selected in a simple manner using the same parts for either clockwise or counterclockwise rotation.

Further objects will be apparent from the following specification together with the drawings in which.

Figure 1:
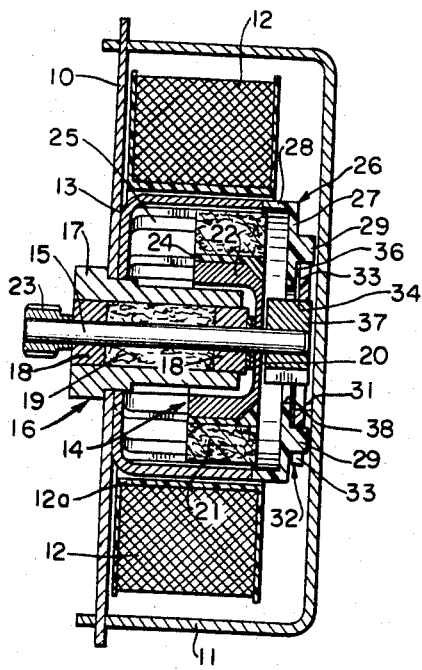
FIG. 1 is a cross-sectional view of a motor and unidirectional control mechanism according to the invention.

The motor shown in FIG. 1 includes a mounting plate 10, a cover 11 within which are located a driving, or field, coil 12 wound on a coil form 12a, a stator pole structure 13 attached to the mounting plate 10, and a rotor structure 14. The rotor structure includes a shaft 15 rotatably held within a bearing structure 16 that includes a hollow support member 17 with two bearings 18, one at each end. Between the two bearings is a reservoir 19 made up of porous material and saturated with a lubricant. Thrust bearings 20 are located adjacent to the inner bearing 18.

The magnetic portion of the rotor is an annular ring 21 of ferromagnetic material having a high coercivity, low permeability, and relatively low specific gravity. The material must be magnetically hard and this, together with the other characteristics and high coercivity, permits magnetic pole areas to be induced in the outer periphery of the member 21.

The magnetic member 21 is supported by means of a web 22 attached to the shaft 15 and cemented to the annular ring of ferromagnetic material 21 by means of a suitable cement 24.

The stator pole structure 13 has a plurality of individual poles 25 extending parallel to the axis of the shaft 15 and forming a circle having an inner diameter slightly larger than the outer diameter of the adjacent portion of the annular rotor ring 21. A platform 26 is located at the end of the stator poles 25 and comprises a flat section 27, a rim 28 that rests on the ends of the poles 25, a plurality of indexing pins (not shown in this FIG.) that fit between pairs of the stator poles to determine the angular position of the platform 26 with respect to the stator poles, two guide pins 29, and additional spacer members 31 that keep the central portion of the cover 11 from coming too close to the moving parts of the motor. A sliding cam member 32 having slots 33 at each end fits over the pins 29 to be guided thereby so that it is free to slide only in one direction parallel to the surface of the plate 27. The cam member 32 has a central opening 34 which will be described in greater detail hereinafter and a plurality of protuberances 36 that are actually the only parts of the member 32 that touch the surface of the plate 27. These protuberances are rounded so as to reduce as much as possible frictional engagement between the cam member 32 and the platform 26.

A special pinion 37 having, in the present embodiment, three lobes, or teeth, is attached to the end of the shaft 15 so as to rotate within a central opening 38 of the platform 26 and within the aperture 34 of the cam member 32.

The material of which the rotor ring 21 is made is a magnetic material having high coercivity and low permeability and relatively low specific gravity. One material which has been found to be satisfactory for this purpose is a barium ferrite material, which is ceramic and is commercially available as "Magnadure" from Ferroxcube Corporation of America. This material is magnetically hard, having a relatively high coercivity of approximately 16,000 oersteds and a specific gravity of about 4.5 with a permeability approximately equal to that of air. The material is available in Europe under the designation of Ferroxdure I. Other commercially available barium ferrite materials suitable for the rotor ring 21 are, for example, "Index I," of the Indiana General Corporation. The chemical composition of barium ferrite is $BaFe_{12}O_{19}$.

Figure 2:
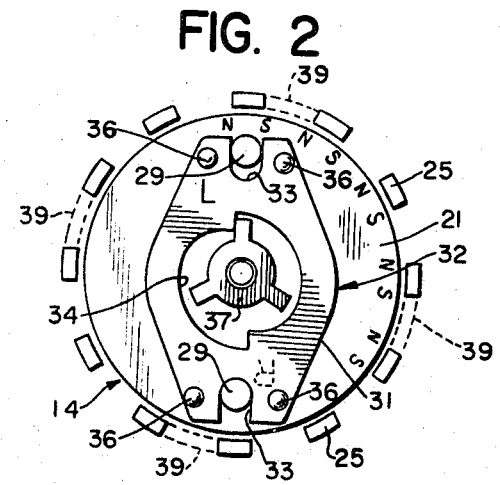
FIG. 2 shows the relationship between the rotor and stator poles of the rotor in FIG. 1 in the quiescent condition.

The rotor material having the foregoing characteristics makes it possible to induce magnetic poles of opposite polarity in closely spaced regions around the periphery of the ring 21, and in FIG. 2, the positions of these magnetic rotor poles are indicated by the letters N for the north poles and S for the south poles. FIG. 2 shows an end view of the rotor ring 21, and the individual rotor poles are preferably induced in such a way that they extend the full axial length of the ring 21. As may be seen, adjacent poles of the ring 21 are of opposite magnetic polarity, and in the embodiment shown, there are 24 such poles: 12 north magnetic poles and 12 south magnetic poles, all equally spaced around the perimeter of the rotor ring 21 and with each north pole equally spaced from adjacent south poles on each side. In general, the individual magnetic poles are relatively wide compared to the regions between adjacent poles, which are relatively thin and have little or no magnetism.

The stator of this motor has only a single set of salient stator poles 25 spaced around the rotor ring 21. The angular spacing between adjacent poles 25 is the same as the angular spacing between successive north poles or successive south poles of the rotor ring 21, and the poles 25 are so energized magnetically that they all assume the same magnetic polarity whenever the coil 12 is energized. In the absence of any energization of the coil 12 in FIG. 1, the only magnetic attraction between the rotor poles of the rotor ring 21 and the stator poles 25 is due to the magnetic field of the rotor poles. Because of the relative angular spacing between the rotor and the stator poles, the quiescent position of the rotor will automatically correspond to the position in which each of the stator poles 25 bridges the space between two adjacent rotor poles, one of which has a north magnetic polarity and the other of which has a south magnetic polarity. The magnetic circuit is completed through the material of the rotor ring 21 along arcuate flux lines as shown in FIG. 2.

Assuming substantially exact uniformity of angular positions of each of the rotor and stator poles, when the stator poles 25 are energized by current flowing in the coil of FIG. 1, all of the stator poles will take on the same magnetic polarity. Depending on the part of the cycle of the alternating current with which the coil 12 is energized, the coils 12 will initially be either north poles or south poles. If they are north poles, they will attract the closest set of south poles of the rotor ring 21, and, as may be seen by inspection of FIG. 2, the rotor ring 21 will thus be forced to rotate counterclockwise. On the other hand, if the stator poles 25 are magnetically energized so that initially they become sufficiently strong south magnetic poles, they will force the rotor ring 21 to turn in a clockwise direction because of the force of attraction between each of the stator poles 25 and the closest north magnetic rotor pole, and also because of the force of repulsion between each of the stator poles 25 and the closest south magnetic rotor pole.

In saying that the initial energization of the stator poles will cause the rotor to rotate either counterclockwise or clockwise, it is assumed that the initial magnetic strength induced in the stator poles 25 will be sufficient to cause this rotation of the rotor ring 21. In many instances, the coil 12 of FIG. 1 will be connected to an alternating current source at an instant when the alternating current has a relatively low value and is on the point of changing to the other polarity. In that case the initial magnetic field induced in the stator poles 25 may not be sufficient to effect a definite movement of the rotor ring 21 to establish a fixed direction of rotation of the rotor ring 21, and the latter may therefore start in one direction but almost immediately be returned and start to rotate in the opposite direction as the polarity of alternating current in the coil 12 in FIG. 1 reverses each half cycle. This may cause the rotor ring 21 to oscillate back and forth magnetically with alternations in the energizing current supplied to the coil 12 until the circumstances are such that a definite direction of rotation of the rotor ring 21 is established, but this direction may be either counterclockwise or clockwise insofar as the basic magnetic components in FIG. 2 are concerned.

In accordance with the objects of the present invention means are provided to prevent the rotor ring 21 from rotating more than a specific amount in one direction, which is defined as the wrong direction. Once the rotor ring 21 has rotated to this extent, limiting means will come into play to prevent the rotor ring from going beyond that point. This tends to minimize the extent of incorrect rotation of the rotor ring 21 and to stop this incorrect rotation within the shortest practical time.

The structure that brings about this operation is shown in simplified form in FIG. 2 overlaid on the rotor and stator members shown there. It includes the lightweight cam member 32 placed so that it can slide back and forth on the pins 29. The platform 26 on which the pins 29 are mounted is not shown although four of its indexing pins 39 are shown spaced 90° apart around the circle of the stator pins 25 and having angular dimensions such as to fit reasonably snuggly between pairs of the stator poles. As may be seen, the pins 29 lie along a diameter of the rotor ring 14 and the stator poles 25 that passes directly through the centers of two of the stator poles.

Figure 3:
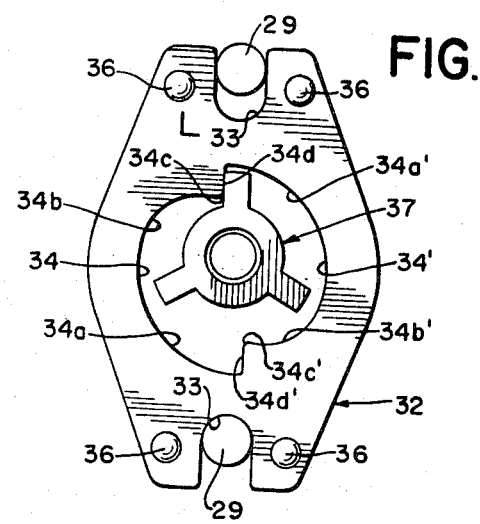
FIG. 3 shows one surface of the cam member of FIG. 1 and a three-lobe rotating member associated therewith.

FIG. 3 is an enlarged view of one surface of the cam member 32 in FIGS. 1 and 2. The cam member may be made out of any material, either a metal or a plastic, that will satisfy the requirements to be fulfilled, one of which is that the cam member must slide easily back and forth on the plate 27 in synchronism with the rotation of the rotor. If, as in the preferred case, there are three lobes on the pinion 37, the cam member 32 will slide back and forth three times for each revolution of the rotor. Therefore light weight and low friction are essential. Moreover, the cam member must be made of material which is not so hard or abrasive as to wear away the lobes of the rotating pinion 37 too quickly nor must it be so soft as to be worn away itself by the constant movement of the rotating pinion. It is also essential that each cam member 32 be as nearly identical as possible with other cam members in order to permit mass production of the part and that its dimensions and contours remain fixed during use. This can best be accomplished by molding the cam members out of a material which has good dimensional stability, such as glass-filled Delrin.

The cam surface 34 and 34' is on the interior of the member and is symmetrical about the center of the member. Basically each of the two sections 34 and 34' comprises one part 34a and 34a' having a relatively large radius which is greater than the distance from the center to the cam surface and another part 34b and 34b' having a smaller radius which is less than the distance from the center of the whole surface 34 and 34' to that part 34b and 34b' of the cam surface. These two parts of each section of the cam meet along a common tangent so that there is no bump between the two, and in fact, the section 34b and 34b' of smaller radius may be considered a ramp on the cam surface terminating in a rounded nose 34c and 34c' and a straight abutment wall 34d and 34d' out to the part 34a' and 34a of larger radius in the other cam section 34' and 34, respectively. The center of curvature of the smaller curvature parts is displaced farther from the center of the whole surface 34 and 34' than is the abutment wall 34d and 34d' and the nose 34c and 34c' and as a result, each of the two sections 34 and 34' resembles a half of a heart-shaped cam with the part 34b and 34b' of smaller radius of each of the two sections spiraling inwardly toward the center.

It will be noted that the two abutment edges 34d and

34d' are displaced symmetrically parallel to a common diameter that passes through the centers of the slots 33. The amount of this displacement is approximately one-half the thickness of one of the teeth of the rotating pinion 37, although this may be varied somewhat. However, the abutment edges 34d and 34d' form the actual stopping points of the teeth of the rotating pinion and therefore must be properly fixed with respect to the stator poles 25 and the rotor poles so that when the teeth of the pinion 37 strike the abutments 34d and 34d', there will, within half a cycle of the applied alternating current, be a forward torque on the rotor 14 to pull the teeth away from the abutments, no matter which tooth rests against which abutment.

In order to permit the cam member 32 to slide most easily on the platform, several knobs or protuberances 36 are formed in each surface. All of the knobs are arranged symmetrically and there are the same number and placement of knobs on both surfaces of the member 32 so that the member can be used with either surface facing the plate 27.

The slots 33 permit movement of the cam member back and forth along the diameter on which they lie, but they are formed to fit sufficiently snugly upon the pins 29 extending from the plate 27 so that there will be relatively little movement of the cam member 32 in any direction except along this diameter. This is essential because, as has been stated, the rotor must be brought to a halt, if it attempts to rotate in the wrong direction, in a position where it will receive forward torque as the alternating current in the coil reverses its polarity. In a rotor of the type in Patent 3,059,131 where there are 24 rotor poles, each equally spaced from adjacent poles on each side, there are twenty four stopping places that will cause the rotor to assume a minimum reluctance position with respect to the stator poles 25 when the alternating current is turned off. Twenty four poles equally spaced around a 360° circle means that the pole centers are spaced 15° apart. However, if there are three teeth on the pinion 37, and if there are two abutments 34d and 34d' to catch the three teeth, the most that the rotor could rotate in the wrong direction before being stopped would be 120° but in normal operation it would be expected that the rotor would be stopped within 60° and when it is stopped, its position must be within approximately ± three degrees of the optimum position in which maximum forward torque can be exerted on the rotor at least once in each half cycle of alternating current.

It will be noted in the drawing that there is a letter L on the surface of the cam member that faces upward in the drawing and that there is a letter R on the reverse surface of the cam member. The letter R appears in broken outline since it is on the back surface with respect to the drawing. The significance of the letters L and R is simply that if the cam member is placed on the rotating member with the letter R facing up and the letter L facing the platform, the rotor will rotate clockwise, which has been identified as right hand rotation, whereas if the cam member is placed on the platform in the reverse position with the letter L facing upward and the letter R facing the platform, rotation will be in the opposite direction. This permits the same cam member to serve for both clockwise and counterclockwise rotation of the motor.

Figure 4:
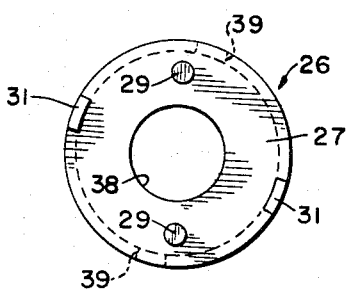
FIGS. 4 and 4a are top and side views of the platform in FIG. 1 on which the cam member slides.
Figure 4A:
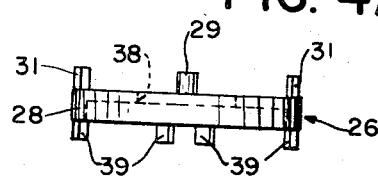

FIG. 4 is a plan view of the platform 26 and FIG. 4a is a side view of the same platform. The platform is round and has the same diameter as the ends of the stator poles 25 of FIG. 1. On top of the platform and extending above the flat plate section of the plate 27 thereon are the two guide pins 29 on which the cam member 32 slides back and forth and two spacer members 31 that help to space the inner surface of the cover 11 (FIG. 1) away from the moving parts of the motor.

As may be seen, the pins 29 are not on the same diameter as any of the indexing pins 39 in this embodiment. However, the angular spacing between the diameter on which the pins 29 lie and the diameters of the indexing pins 39 is not completely arbitrary but is important because it establishes the relative position of the abutment walls 34d and 34d' of the sliding cam member 32, as described in connection with FIG. 3 in particular. The angular orientation of these parts is also determined by the angular position of the teeth on the rotating pinion 37, and in the embodiment shown, the center of each of the teeth is midway between centers of adjacent rotor poles on the rotor 21. Since the pins 29 are directly aligned with two diametrically opposed poles 25, as disclosed in connection with FIG. 3, the angle between the centers of the nearest pair of indexing pins 39 and the diameter passing through the pins 29 will, in this embodiment, be 15°.

While the invention has been described in terms of a specific embodiment, it will be understood by those skilled in the art that modification can be made therein without departing from the true scope of the invention as defined by the following claims.

What is claimed is:

1. A unidirectional rotational control mechanism for a motor having a rotor capable of revolving in either direction, said motor comprising a stator having a plurality of stator poles, said mechanism comprising: a rotating member attached to said rotor to revolve therewith and having an odd number of lobes; a cam having an internal cam surface adjacent to said rotating member to be engaged by said lobes, said cam surface being divided into first and second symmetrical parts about a center, each of said parts comprising a sloping ramp which begins at a radial distance from said center greater than the maximum radius of any of said lobes and terminates closer to said center than the radius of said lobes, said first part having an abutment edge joining the terminating end of said first part to the other end of said second part and said second part having a second abutment edge joining the terminating end of said second part with the other end of said first part; and means to limit the motion of said cam to a direction substantially perpendicular to the axis of said rotating member whereby said cam may be moved back and forth as said lobes alternately press against said first and second ramps when said rotor revolves in the proper direction.

2. The mechanism of claim 1 in which there is at least one lobe and not more than five lobes.

3. The mechanism of claim 1 in which both of said abutment edges are substantially parallel to the direction of motion of said cam.

4. The mechanism of claim 3 in which said abutment edges are offset from a radial direction by an amount approximately equal to the angular thickness of one of said lobes.

5. The mechanism of claim 1 in which said stator poles extend substantially parallel to the axis of said rotor and are at least substantially as long as the axial length of said rotor, said mechanism comprising, in addition: a platform comprising locating means engaging said stator poles to locate said platform angularly, and said cam comprises a flat member sliding on the surface of said platform facing away from said stator poles.

6. The mechanism of claim 5 in which said platform comprises locating pins on diametrically opposite sides of the axis of said rotor and said cam comprises slots fitting over said pins and extending substantially radially toward the axis of said rotor to guide said cam in substantially lateral transverse movement on said platform.

7. The mechanism of claim 6 in which said cam is a substantially completely flat member capable of being assembled with said platform with either face of said flat member facing said platform to permit said rotor to rotate only clockwise or only counterclockwise, depending on which face of said cam member faces said platform.

8. The mechanism of claim 7 in which said platform and said cam are made of substantially rigid low friction plastic and said cam member comprises symmetrically placed protuberances on both of its surfaces, said protuberances and the inner surface of said slots being the only parts of said cam member making contact with said platform.

9. The mechanism of claim 8 in which there are 12 stator poles and said platform has at least three bosses fitting closely between spaced pairs of said stator poles to locate said platform angularly, said mechanism comprising, in addition: a cover over said cam member and said platform and affixed to said stator, the distance between the inner surface of said cover and the proximal surface of said cam member being less than the height of said pins plus the thickness of said cam member, whereby said cam member is prevented by said cover from becoming disengaged from said pins.

References Cited

UNITED STATES PATENTS

| | | | |
|---|---|---|---|
| 2,601,517 | 6/1952 | Hammes | 310—156 X |
| 2,972,687 | 2/1961 | Köhler | 310—41 |
| 3,200,915 | 8/1965 | Lundin | 310—41 X |
| 3,231,770 | 1/1966 | Hyde | 310—156 |

FOREIGN PATENTS 550,809  1/1943  Great Britain.

MILTON O. HIRSHFIELD, *Primary Examiner.*

WARREN E. RAY, *Assistant Examiner.*